(12) United States Patent
Brenes et al.

(10) Patent No.: US 7,228,303 B1
(45) Date of Patent: Jun. 5, 2007

(54) SYSTEM AND METHOD FOR REMOTE MANIPULATION OF ANALYTIC REPORTS

(75) Inventors: Gunther L. Brenes, Oakland, CA (US); L. Douglas Everhart, Arlington, VA (US); Arturo Oliver, Reston, VA (US); Ramkumar Ramachandran, Reston, VA (US); Xinyi Wang, Falls Church, VA (US)

(73) Assignee: MicroStrategy Inc., McLean, VA (US)

( * ) Notice: Subject to any disclaimer, the term of this patent is extended or adjusted under 35 U.S.C. 154(b) by 763 days.

(21) Appl. No.: 09/884,477

(22) Filed: Jun. 20, 2001

(51) Int. Cl.
G06F 17/00 (2006.01)
G06F 7/00 (2006.01)

(52) U.S. Cl. .......................... 707/10; 707/102; 707/101
(58) Field of Classification Search ................. 707/9, 707/103, 104, 1, 10, 102, 101; 705/37, 26; 714/1; 709/200–219
See application file for complete search history.

(56) References Cited

U.S. PATENT DOCUMENTS

| | | | |
|---|---|---|---|
| 4,688,195 A | 8/1987 | Thompson | |
| 4,829,423 A | 5/1989 | Tennant | |
| 5,197,005 A | 3/1993 | Shwartz | |
| 5,276,870 A | 1/1994 | Shan | |
| 5,418,943 A | 5/1995 | Borgida | |
| 5,421,008 A | 5/1995 | Banning | |
| 5,555,403 A | 9/1996 | Cambot | |
| 5,584,024 A | 12/1996 | Shwartz | |
| 5,664,182 A | 9/1997 | Nierenberg | |
| 5,692,181 A | 11/1997 | Anand | |
| 5,864,856 A | 1/1999 | Young | |
| 5,914,878 A | 6/1999 | Yamamoto | |
| 6,154,766 A | 11/2000 | Yost | |
| 6,247,008 B1 | 6/2001 | Cambot | |
| 6,279,033 B1* | 8/2001 | Selvarajan et al. ......... 709/217 |
| 6,594,672 B1* | 7/2003 | Lampson et al. ....... 707/103 R |
| 6,654,726 B1* | 11/2003 | Hanzek ....................... 705/26 |
| 6,708,155 B1* | 3/2004 | Honarvar et al. .............. 705/7 |
| 2002/0059098 A1* | 5/2002 | Sazawa et al. ................ 705/14 |
| 2002/0083058 A1* | 6/2002 | Hsiao et al. .................... 707/9 |
| 2002/0144174 A1* | 10/2002 | Nwabueze ..................... 714/1 |
| 2002/0174050 A1* | 11/2002 | Eynard et al. ................ 705/37 |
| 2003/0191799 A1* | 10/2003 | Araujo et al. ............... 709/203 |

OTHER PUBLICATIONS

A Scalable Web_Based Business Intelligence Platform, An Oracle White Paper, Apr. 2001.*

(Continued)

*Primary Examiner*—John Cottingham
*Assistant Examiner*—Kuen S. Lu
(74) *Attorney, Agent, or Firm*—Hunton & Williams LLP

(57) ABSTRACT

A remote client interface to manipulate OLAP and other reports is described. A Web client or other thin client may access an intelligence server via an intermediate network server. The network server may translate between HTML or other code supplied by the client, in order to access a database serviced by the intelligence server in all its functionality. For instance, a user may clink onto a linkable URL to access a stored report run against the remote database, and perform operations on that report, such as doing a table pivot, page down, running totals or averages, or other functions. Multiple users may access the report and other data resources using different interfaces.

25 Claims, 5 Drawing Sheets

OTHER PUBLICATIONS

Oracle, Oracle9i OLAP, A Scalable Web_Based Business Intelligence Platform, An Oracle White Paper, Apr. 2001.*

Oracle, Oracle9i OLAP Services, Concepts and Administration Guide, Release 1 (9.0.1), Jun. 2001.*

Oracle, Oracle9i OLAP, A Scalable Web_Based Business Intelligence Platform, An Oracle White Paper, Apr. 2001, not cited.*

Oracle, Oracle9i OLAP Services, Concepts and Administration Guide, Release 1 (9.0.1), Jun. 2001, not cited.*

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

Microstrategy Announces DSS Web, First Relational OLAP Interface for Accessing Data Warehouses Via the World Wide Web.

Microstrategy Announces DSS Web 4.1, Latest Version Provides Web-Based Warehouse Users With More Complex Ad Hoc Analysis Capabilities Than Any Product Available.

Microstrategy Announces DSS Web 5.0, DSS Web Introduces the Web-Cast of Decision Support.

Microstrategy Addresses Customer Needs With DSS Web 5.1, New Version Provides a Bridge Between Active and Passive Decision Support Environments and Eases the Global Implementation and Deployment Process.

Microstrategy Introduces DSS Web Standard Edition, Web Interface Provides Powerful, Easy-to-Use DSS Tool For Mainstream End-User Market.

Microstrategy Announces Enhanced Versions of DSS Web and DSS Server, New 5.5 Versions offer Advanced Reporting Functionality on Top of the Industry's Most Powerful Analytical Engine for Enterprise-Wide DSS Solutions.

Kurz, A. et al., Data warehousing within intranet: prototype of a web-based executive information system, IEEE Database and Expert Systems Applications, pp. 627-632.

Business Objects User's Guide Version 5.1 (electronic copy on enclosed CD).

Getting Started with Business Objects Version 5.1 (electronic copy on enclosed CD).

Business Objects Deployment Guide (electronic copy on enclosed CD).

Broadcast Agent 5.1 (electronic copy on enclosed CD).

Business Objects 5.1 (electronic copy on enclosed CD).

Web Intelligence 2.6 (electronic copy on enclosed CD).

Business Objects Designer's Guide Version 5.1 (electronic copy on enclosed CD).

Business Objects Error Message Guide Version 5.1 (electronic copy on enclosed CD).

Business Objects Generic ODBC Access Guide Version 5.1 (electronic copy on enclosed CD).

Business Objects Info View User's Guide (electronic copy on enclosed CD).

Business Objects Installation and Upgrade Guide (electronic copy on enclosed CD).

Business Objects MS Access Database Guide Version 5.1 (electronic copy on enclosed CD).

Business Objects MS SQL Server Database Guide Version 5.1 (electronic copy on enclosed CD).

Business Objections Supervisor's Guide Version 5.1 (electronic copy on enclosed CD).

Quick Start MicroStrategy Agent Version 6.0 (electronic copy on enclosed CD).

User Guide MicroStrategy Agent Version 6.0 (electronic copy on enclosed CD).

User Guide MicroStrategy Architect Version 6.0 (electronic copy on enclosed CD).

User Guide MicroStrategy Objects Version 6.0 (electronic copy on enclosed CD).

Exel Add-In MicroStrategy Objects Version 6.0 (electronic copy on enclosed CD).

J. Emigh, Information Builders, Inc. Launches WebFocus Suite, pp. 1-3.

Robert C. Stern, Bruce M. Anderson and Craig W. Thompson, A Menu-Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces To Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

User Guide MicroStrategy Intelligence Server Version 6.0 (electronic copy on enclosed CD).

User Guide MicroStrategy Administrator Version 6.0 (electronic copy on enclosed CD).

Administrator Guide MicroStrategy Administrator Version 6.5 (electronic copy on enclosed CD).

Web Intelligence Key Sales Messages (electronic copy on enclosed CD).

Web Intelligence Sizing and Capacity Planning Questions and Answers (electronic copy on enclosed CD).

MicroStrategy Web Version 6.0 System Guide (electronic copy on enclosed CD).

Developer Guide MicroStrategy Web Version 6.0 (electronic copy on enclosed CD).

System Guide Microstratey Web Version 6.2 (electronic copy on enclosed CD).

Developer Guide MicroStrategy Web Version 6.5 (electronic copy on enclosed CD).

* cited by examiner

SYSTEM AND METHOD FOR REMOTE MANIPULATION OF ANALYTIC REPORTS

FIELD OF INVENTION

The invention relates to the field of data processing, and more particularly to the enablement of remote viewing and modification of analytic reports, such as OLAP reports, via a network port such as a Web browser or other thin client.

BACKGROUND OF THE INVENTION

The deployment of large scale databases in commercial organizations and others has led to improvements in sales forecasting, inventory control, and other strategic predictions. One prevailing technique is to run analytic reports against databases, for instance online analytic processing (OLAP)-compliant databases, to identify trends and other significant information.

However, the use of such engines may not be convenient or user friendly. For instance, many OLAP-based intelligence engines may require a manager or other user to be seated in front of a workstation equipped with a standard query language (SQL) or other database-compatible software package in order to initiate, view, modify, or store reports. Productivity might be improved if the users of such systems could obtain easier and less cumbersome access to the query engines, reports and other outputs. Other problems exist.

SUMMARY OF THE INVENTION

The invention overcoming these and other problems in the art relates in one regard to system and method for the remote manipulation of analytic reports, in which a user or group of users may access a relational database management system (RDBMS) or other database resource via remote network connections, such as the Internet or other networks. In one embodiment, a user may use a user interface to gain access to query and report functions available in the database via a network server. The user interface may be or incorporate a Web browser or other thin client or other interface, and the network server may communicate with the user interface using, for instance, HTML (hyper text markup language) code. The network server may in turn translate the HTML or other browser requests to other code, such as XML or other code, to communicate with an intelligence server servicing the database or other data resource. Reports and other outputs may be presented back to the user on the user interface as URLs (universal resource locator) links or other HTML constructs, to permit the user to ask for table pivots, pagedowns, sorting, totalling or other functions via the Web or other interface. A copy of the report or other output may be stored or cached in the intelligence server, the network server or elsewhere to optimize execution of the output manipulations.

BRIEF DESCRIPTION OF THE DRAWINGS

The invention will be described with reference to the accompanying drawings, in which like elements are referenced with like numbers.

DETAILED DESCRIPTION OF PREFERRED EMBODIMENTS

Figure 1:
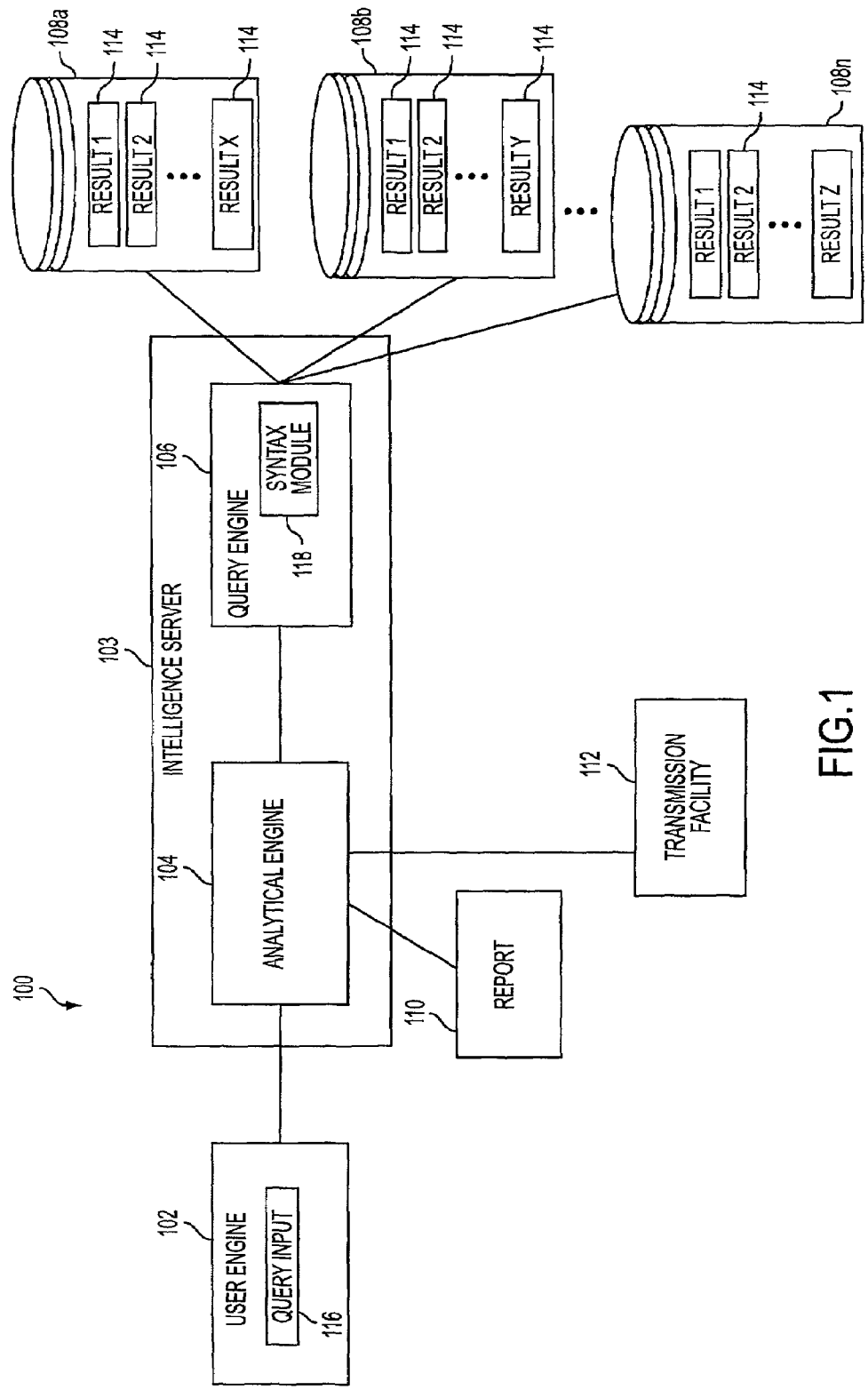
FIG. 1 is a block diagram illustrating an architecture for a system according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103. The intelligence server 103 in implementations be, include or interface to a reporting server, a business intelligence server, a decision support system, or an OLAP system, among other types of platform.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b. . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the MicroStrategy 7 and 7.1 platform, the details of which will be appreciated by one of ordinary skill in the reporting and decision support system art.

Figure 2:
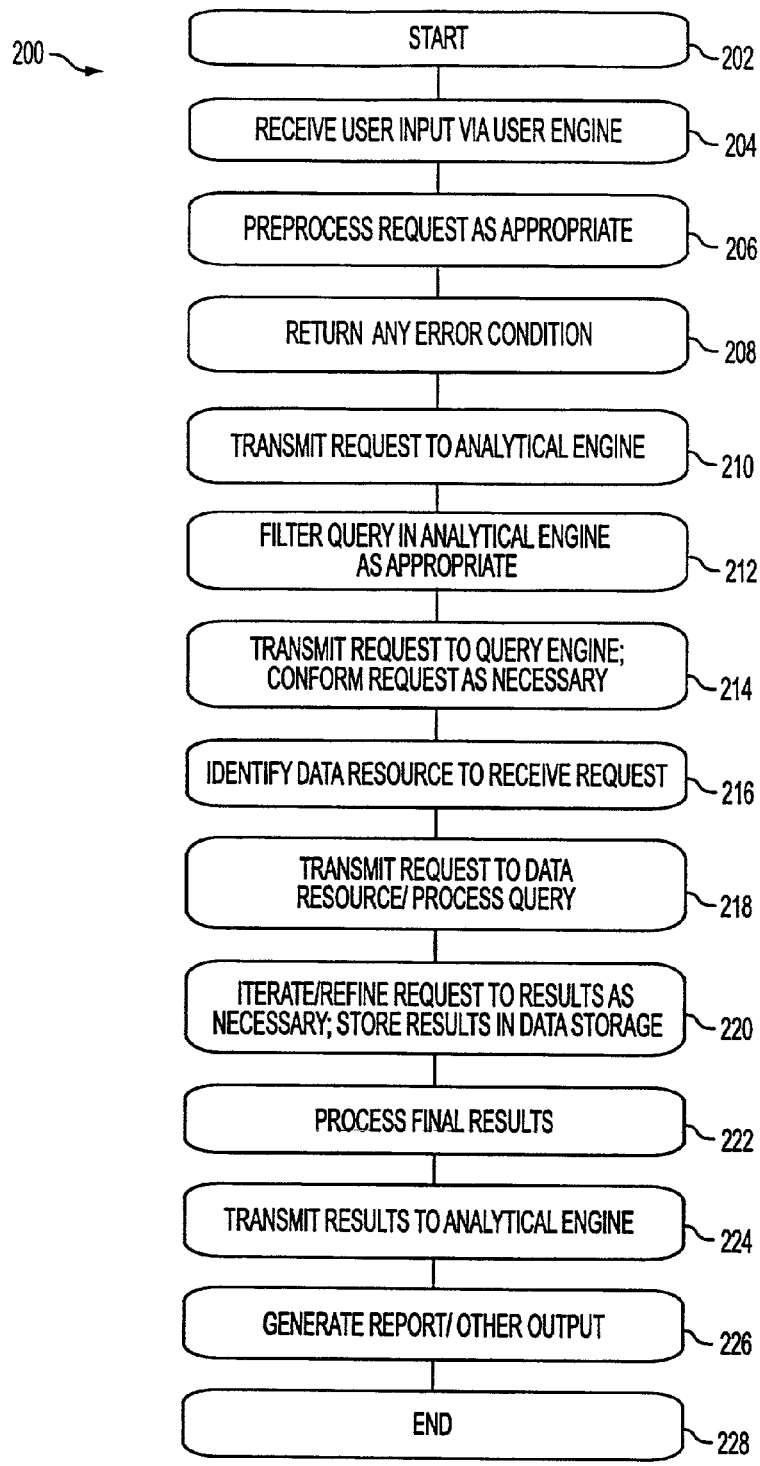
FIG. 2 is a flowchart illustrating steps performed by a process utilizing a query engine according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 3:
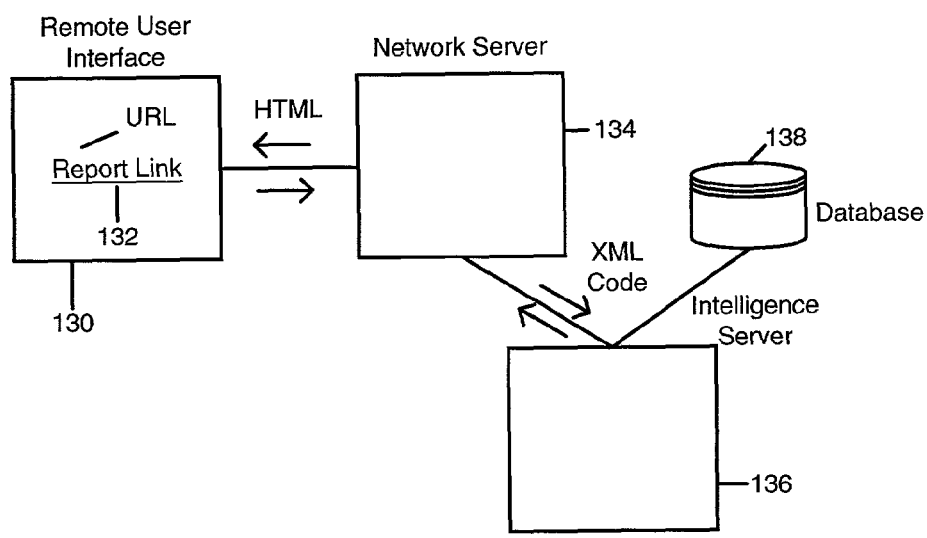
FIG. 3 is a block diagram illustrating an architecture for a system according to an embodiment of the invention.

In an embodiment illustrated in FIG. 3, a user may use a user interface 130 to access data resources, reports and other outputs according to the invention. The user interface 130 may be or include, for instance, a Web browser or other HTML-based or other thin client terminal capable of communicating with a network server 134, such as a Web server. The user interface 130 may communicate with the network server 134 over a variety of wired or wireless network connections, such as a DSL (Digital Subscriber Line) connection, an Ethernet connection, an ISDN (Integrated Services Digital Network) line, a dial-up port such as a V.90, V.34 or V.34bis analog modem connection, a cable modem, a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a RIM (Research in Motion, Limited) duplex paging type device, a Bluetooth radio link, an IEEE 802.11 (Wi-Fi)-based radio frequency link, or other TCP/IP or other network connection.

The network server 134 may receive HTML or other code transmitted via user interface 130 and translate that code into another protocol for the purpose of accessing data resources. In an illustrated embodiment, the network server 134, such as a Web server, may translate the HTML or other code into XML (extensible markup language) or other code, to communicate with an intelligence server 136. The intelligence server 136 may communicate with a database 138, which may for instance be or be part of data storage devices 108a, 108b . . . 108n described elsewhere herein.

The user may communicate via a graphical user interface (GUI) or other interface a set of commands or requests to execute searches against database 138, such as by query boxes, radio buttons or other input mechanisms. One a search or request is run against the database 138, a report 110 may be generated, using OLAP and other techniques. In this embodiment of the invention, the user interface 130 may present the user with a report link 130, representing a URL which is linkable to a desired report using HTML or other code compatible with the user interface 130.

Figure 4:
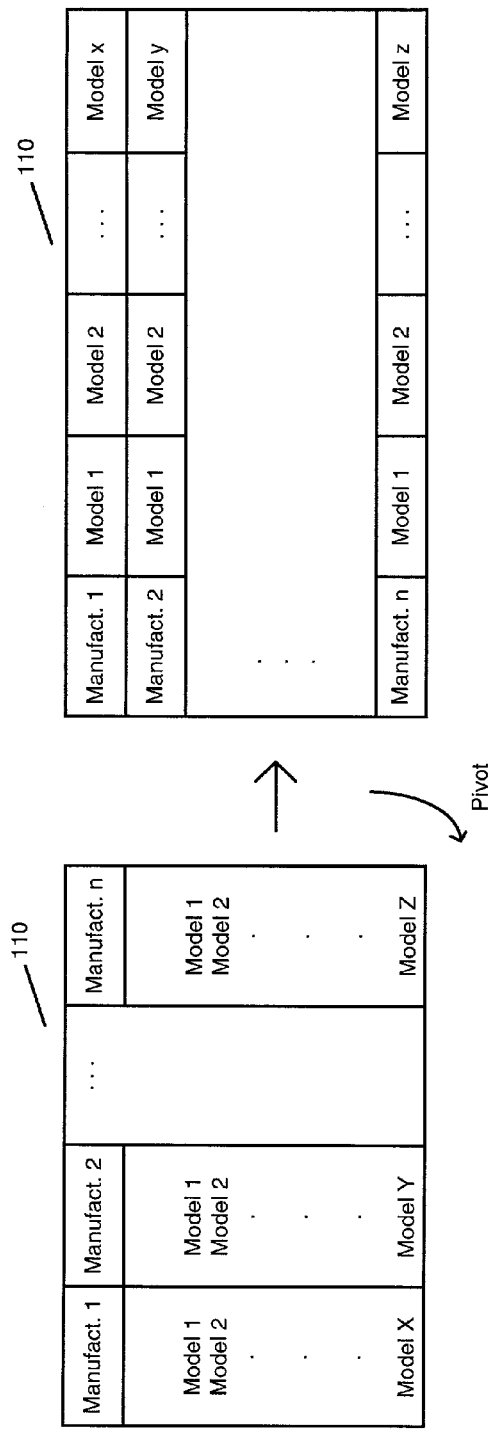
FIG. 4 is a block diagram illustrating a method for presenting a set of options for manipulating a report according to an embodiment of the invention.

For instance, in an embodiment of the invention illustrated in FIG. 4, a user may request a report 110 on the database 138 for a list of all car models according to manufacturers, whose schema appears as a set of manufacturer columns (Manufacturer 1, Manufacturer 2 . . . Manufacturer n) containing lists of models available from those respective manufacturers. However, according to the invention, once report 110 is generated, it may be further manipulated by the user at user interface 130 without a need for specialized software or other resources that may typically be associated with the database 138. For instance, the user may click on report link 132 to see an image of the report 110 temporarily or permanently stored or cached on the intelligence server 136. That linkage may not require any greater network enabled resources than an HTML-based browser or other thin client, since the network server 134 serves to translate that type of code into XML or other more data-aware protocols for accessing the intelligence server 136 and report 110.

Furthermore, the user may be presented on the user interface 130 with a set of options to manipulate the report 110 at the user interface 130. For instance, as illustrated in FIG. 4, the user may be presented with a linkable or clickable pivot table option (such as a by a highlighted URL or selection box) that causes an HTML or other command to be transmitted to the network server 134 for translation and re-presentation of the report 110 at the user interface, with the axes of the table switched. This effect is shown with the set of manufacturers being presented as rows rather than columns, and car models as fields in the rows, after the effect of the pivot.

Figure 5:
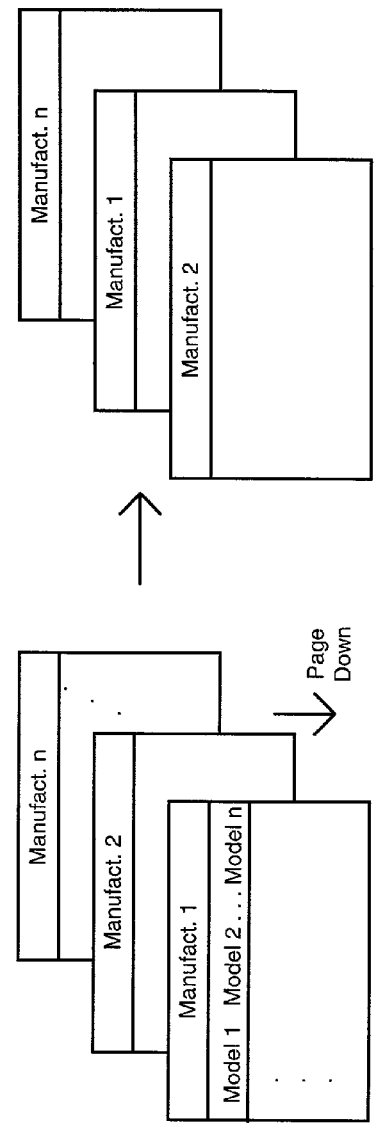
FIG. 5 is a block diagram illustrating a method for performing manipulations of a report according to an embodiment of the invention.

Similarly, by clicking a link or entering other input, the user may perform other manipulations of the report 110 generated remotely at the intelligence server 136. In an embodiment illustrated in FIG. 5, such other functions or manipulations may include a pageby function, to step through successive pages of a multidimensional report 110 or other output. Other manipulations of the report 110 or other output are possible, such as sorting on rows, columns or other portions of the report, running totals on various portions of the report, running averages or standard deviations, inverting sort orders, and other manipulations, each of which may be done repeatedly. When finished, a user may store the existing or modified report 110 under further report links 132 which activate images of the report 110 stored on intelligence server 136, network server 134 or elsewhere. In instances, a network implementation according to the invention may result in greater responsiveness when viewing or manipulating a report 110 than if the report 110 and viewing tools were stored and executed on the user engine 102, since the network server 134, intelligence server 136 and other network resources may house significantly more processing and input/output power than a client type machine. The throughput differential may be particularly advantageous when the report 110, for instance, is large.

Figure 6:
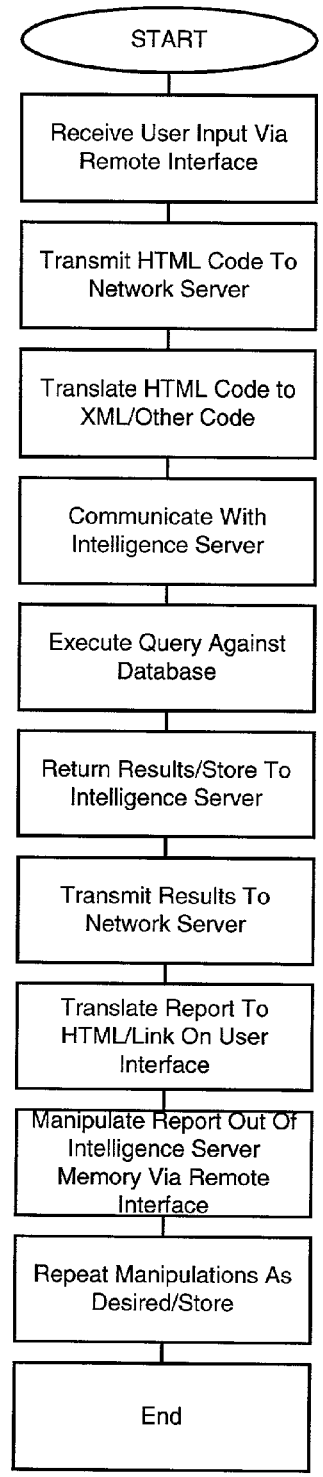
FIG. 6 is a flowchart illustrating steps performed by a process for distributed computation according to an embodiment of the invention.

Overall processing of remote analytic reports according to the invention is illustrated in FIG. 6. In step 602, processing begins. In step 604, an input may be received from the user via the user interface 130. In step 606, the user input may be transmitted to the network server 134 using HTML or other network enabled code. In step 608, the network server 134 may translate or convert the user's input to XML or other network enabled code. In step 610, the network server 134 may communicate the translated code or commands to the intelligence server 136, such as for executing a search against the database 138.

In step 612, a query or other request may be executed against the database 138 under coordination of the intelligence server 136. In step 614, the results may be obtained and stored temporarily or permanently on the intelligence server 136, if desired. In step 616, the results, which may include a report 110, may be transmitted to the network server 134. In step 618, the report 110 or other results may be translated into HTML or other network enabled code, and may be presented as a link or other indication on the user interface 130. In step 620, the report 110 or other output may be manipulated according to user input received over the user interface 130, such as by performing pivot, page down, totals, sorts or other functions on a temporary image of the report 110 stored on intelligence server 136, thus increasing responsiveness. In step 622, further manipulations or refinements on the report 110 may be carried out via the remote interface 130. In step 624, processing ends.

The foregoing description of the invention is illustrative, and variations in configuration and implementation will occur to persons skilled in the art. For instance, while the invention has been generally described in terms of a single user accessing a single database over one user interface 130, multiple users may access the same or multiple databases, in different embodiments. Likewise, the same or multiple users could user different numbers or types of user interfaces 130, to perform manipulations on the output of the database 138. The scope of the invention is accordingly to be limited only by the following claims.

The invention claimed is:

1. A system for remote interactive access to data, comprising:
   a network server performing:
      receiving user input to remotely manipulate or modify at least one report generated by at least one data source based on content in the data source,
         wherein the report was previously served to a user system;
      presenting one or more markup language constructs associated with actions to manipulate or modify the at least one report;
      enabling user input in the report,
         wherein the user input is initiated by activation of a markup language construct associated with the at least one report that was served to the user system and translating the user input received via first network enabled code to second network enabled code;
   a reporting server being configured to respond to the user input, performing:
      communicating with the user interface;
      accessing an image of the at least one report;
      manipulating the at least one report generated from the at least one data source; and
      generating results to present via the user interface; and
   a user interface performing:
      remotely accessing and viewing at least one report generated from at least one remote data source; and
      providing user input to remotely manipulate or modify the at least one report,
         wherein the user input being provided by activating a markup language construct, and
      wherein the user input being translated from a first network enabled code to a second network enabled code.

2. The system of claim 1, wherein the image of the at least one report comprises an image stored in at least one of an electronic memory and a storage medium of the reporting server.

3. The system of claim 1, wherein the network server comprises a Web server.

4. The system of claim 3, wherein the Web server is configured to—
   access the at least one data resource via the second network enabled code; and
   present results to the user via the first network enabled code.

5. The system of claim 4, wherein the first network enabled code comprises at least HTML code.

6. The system of claim 4, wherein the second network enabled code comprises at least XML code.

7. The system of claim 4, wherein the user input is received from a Web browser.

8. The system of claim 1, wherein the at least one data source comprises at least one OLAP-enabled database.

9. The system of claim 1, wherein the results presented to the user are modifiable.

10. The system of claim 9, wherein the modifications to the results comprise at least one of a table pivot, a pageby, a recalculated sum and a recalculated sort.

11. The system of claim 10, wherein the modifications to the results are activated by at least one of a URL link and a query box.

12. A method for remote interactive access to data, comprising:
   a network server performing:
      receiving user input to remotely manipulate or modify at least one report generated by at least one data source based on content in the data source,
         wherein the report was previously served to a user system;
      presenting one or more markup language constructs associated with actions to manipulate or modify the at least one report;
      enabling user input in the report,
         wherein the user input is initiated by activation of a markup language construct associated with the at least one report that was served to the user system and translating the user input received via first network enabled code to second network enabled code;

a reporting server being configured to respond to the user input, performing:
  communicating with the user interface;
  accessing an image of the at least one report;
  manipulating the at least one report generated from the at least one data source; and
  generating results to present via the user interface; and
a user interface performing:
  remotely accessing and viewing at least one report generated from at least one remote data source; and
  providing user input to remotely manipulate or modify the at least one report,
    wherein the user input being provided by activating a markup language construct, and
  wherein the user input being translated from a first network enabled code to a second network enabled code.

13. The method of claim 12, further comprising a step c) of storing the image of the at least one report in at least one of an electronic memory and a storage medium of a reporting server.

14. The method of claim 12, further comprising a step of d) communicating with the user interface via a network server.

15. The method of claim 14, wherein the network server comprises a Web server.

16. The method of claim 15, wherein the Web server is configured to—
  access the at least one data resource via the second network enabled code; and
  present results to the user via the first network enabled code.

17. The method of claim 16, wherein the first network enabled code comprises at least HTML code.

18. The method of claim 16, wherein the second network enabled code comprises at least XML code.

19. The method of claim 16, wherein the user interface comprises a Web browser.

20. The method of claim 12, wherein the at least one data source comprises at least one OLAP-enabled database.

21. The method of claim 12, wherein the results presented to the user are modifiable.

22. The method of claim 21, further comprising a step of e) modifying the results by executing at least one of a table pivot, a pageby, a recalculated sum and a recalculated sort.

23. The method of claim 22, further comprising a step of f) modifying the results by activating by at least one of a URL link and a query box.

24. A machine readable storage medium, the machine readable medium being readable to execute a method for remote interactive access to data, the method comprising:
a network server:
  receiving user input to remotely manipulate or modify at least one report generated by at least one data source based on content in the data source,
    wherein the report was previously served to a user system;
  presenting one or more markup language constructs associated with actions to manipulate or modify the at least one report:
  enabling user input in the report,
    wherein the user input is initiated by activation of a markup language construct associated with the at least one report that was served to the user system and translating the user input received via first network enabled code to second network enabled code;
a reporting server being configured to respond to the user input:
  communicating with the user interface;
  accessing an image of the at least one report;
  manipulating the at least one report generated from the at least one data source; and
  generating results to present via the user interface; and
a user interface:
  remotely accessing and viewing at least one report generated from at least one remote data source; and
  providing user input to remotely manipulate or modify the at least one report,
    wherein the user input being provided by activating a markup language construct, and
    wherein the user input being translated from a first network enabled code to a second network enabled code.

25. The medium of claim 24, wherein the method further comprises a step of c) storing an image of the at least one report in at least one of an electronic memory and a storage medium of a reporting server.

* * * * *